Reissued Oct. 14, 1924.

Re. 15,931

UNITED STATES PATENT OFFICE.

GEORGE H. WIGTON, OF EUREKA, AND SAMUEL M. SEDDON, OF SALT LAKE CITY, UTAH.

VOLATILIZATION OF METALS.

No Drawing. Original No. 1,458,016, dated June 5, 1923, Serial No. 579,883, filed August 5, 1922. Application for reissue filed March 18, 1924. Serial No. 700,146.

*To all whom it may concern:*

Be it known that we, GEORGE H. WIGTON and SAMUEL M. SEDDON, citizens of the United States, residing, respectively, at Eureka, in the county of Juab and State of Utah, and at Salt Lake City, in the county of Salt Lake and State of Utah, have invented certain new and useful Improvements in the Volatilization of Metals; and we do hereby declare the following to be a full, clear, and exact description of the same, such as will enable others skilled in the art to which it appertains to make and use the same.

This invention relates to the extraction of metals from ores, or from other mixtures or compounds in which they may be found (all hereinafter referred to as ores), and is particularly applicable to the treatment of those ores in which the metals occur entirely or partially in a state in which they are not recoverable in substantial proportion by standard gravity and flotation concentration processes, or to the treatment of ores of such character that the metals therein have not, heretofore, been capable of satisfactory extraction on a commercial scale by chloride or other volatilization processes. In accordance with the present invention, we add no chloridizing agent, thus permitting the use of a higher temperature than otherwise without fusing the non-volatilizable materials present, and this results in a higher yield of the volatilizable metals if the composition of the furnace charge is properly regulated as hereinafter set forth; and the non-addition of the chloridizing agent results, also, in obtaining a flue-gas which, owing to the absence of free chlorine and hydrochloric acid and other acid compounds formed in the presence of chlorids, permits the successful use of bag-filtration methods.

In the Patent No. 1,264,586, of George H. Wigton, one of the present applicants, a process is described in which the ore is first subjected to treatment by standard concentration methods, such as gravity concentration and flotation and the tailing from that operation is treated by a process known as chlorid volatilization. In the practice of the process of that patent, a silicious ore containing lead was first subjected to grinding, then reduced to a freely flowing pulp, and afterwards passed over a series of gravity concentrating tables where a finished concentrate was recovered and an impoverished reject was sent to flotation machines; here, in turn, a finished concentrate and a tailing were made. The flotation tailing was filtered and partially dried and was then sent to a rotary kiln, where, after the addition of a quantity of an alkaline or alkaline earth chlorid in excess of the combining quantity necessary to effect chloridizing of the metal content of the feed, the whole charge was subjected to the action of heat and the metals were volatilized as chlorin compounds, and were recovered as such in the form of fume. In carrying out that method, we discovered that under certain conditions, hereinafter referred to, the addition of chlorids or any other substances, for the purpose of chemically reacting with the volatilizable constituents and thereby facilitating volatilization, is unnecessary as we can obtain a higher extraction and a more desirable product if no such substances are added in the volatilization process. We discovered also that if the flotation concentration is omitted, when treating ores containing minerals normally recoverable by flotation, it is difficult to volatilize the metals without the addition of salt or other chloridizing agent; from which we have concluded that such minerals, if occurring in substantial proportions, should be eliminated or reduced in amount before employing our invention, or the charge should, by other means, be caused to be of such composition as to act in the manner hereinafter defined.

The conditions hereinabove referred to are attained in the highest degree by correlation of the composition of the furnace feed, the temperature in the furnace, the time of treatment and the degree of thoroughness of the exposure of the charge to gas currents within the furnace; whereby the metals are substantially completely volatilized at a temperature below that at which liquefaction of any considerable part of the non-volatilizable constituents of the charge will take place. Uniformity and quickness of heating and the degree of thoroughness of exposure of the charge, while not essential considerations, are important factors in improving the recoveries and in increasing furnace capacity.

In the practice of the present invention, the range of temperatures through which volatilization of the metals takes place is determined as to its lower limit by the temperature at which the volatilizable elements of the charge melt or sublime, and as to its upper limit by the temperature at which liquefaction of any considerable part of the non-volatilizable constituents takes place.

We so regulate the composition of the furnace charge that substantially complete volatilization of the metals will occur at a temperature below that at which liquefaction of any considerable part of these non-volatilizable constituents takes place. It is desirable in most cases to so regulate the composition of the charge that incipient fusion of a substantial part of the non-volatilizable constituents will occur at the same temperature. We also regulate the time of treatment to the degree of temperature, the highest temperature requiring the shortest period and the lowest temperature requiring the longest period of heating. We likewise regulate the thoroughness of exposure of the charge to the current of furnace gases so that volatilization of the metals and removal thereof will be substantially complete within the treatment period.

A description of a specific example of one method of practicing this invention follows:

An ore was treated that had the following composition: Gold, 0.065 oz. per ton; silver, 29.3 oz. per ton; lead, 9.4 per cent; silica ($SiO_2$), 61.3 per cent; iron, 8.1 per cent; lime (CaO), 2.6 per cent; sulfur, 3.9 per cent. This ore was crushed to pass a 20-mesh screen and concentrated on shaking tables to remove some of the heavier metallic compounds, such as, for instance, lead, iron and zinc sulfids, lead carbonate, etc. The table tailing was reground to pass a 48-mesh screen and was then treated by froth flotation. This treatment removed a further part of the sulfids and produced a tailing suitable for treatment by volatilization. The assay of this material was as follows: Gold, 0.042 oz. per ton; silver, 14.5 oz. per ton; lead, 4.1 per cent; silica ($SiO_2$), 70.1 per cent; iron, 7.4 per cent; lime (CaO), 2.9 per cent; sulfur, 1.7 per cent. The concentration above described so changed the material treated, by elimination of low-fusing metallic sulfids and by increase in the proportion of silica to lime and iron, that the temperature of liquefaction of the non-volatilizable portion of the material was raised, with resulting benefit to the subsequent volatilizing operation.

The flotation tailing was next filtered and dried and then introduced into the volatilizing furnace. By pre-drying the feed, fuel consumption in the volatilizing furnace is lessened, furnace capacity is increased, and incipient fusion of the charge near the feed end of the furnace is more readily accomplished.

Volatilization was performed in a rotary kiln eighteen (18) feet long and thirty-six (36) inches external diameter, with a slope of one-half inch per foot and lined with four and one-half (4½) inches of fire-brick. The furnace was fired at the feed end with pulverized bituminous coal, and a flame extending to or nearly to the discharge end of the furnace was maintained, in order to provide substantially uniform heating throughout the length of the furnace. This method of firing effected incipient fusion of the finer non-volatile particles of the charge very shortly after the introduction of the ore into the furnace. The finer particles, thus softened, cohered and were thereby prevented from being carried by the furnace gases with the volatilized metals into the flues and fume-collecting apparatus. The grade of the fume is raised by thus eliminating non-volatile dust. This makes a more satisfactory product for smelting. Another advantage in this method of firing lies in the fact that any furnace accretions that may form are produced near the feed end of the furnace, where they are readily accessible for removal.

The heat in the furnace was maintained at a temperature such that the calcine or waste product discharged showed incipient fusion. In this particular operation this temperature was between 2300 and 2500 degrees F.

The kiln was charged continuously at the rate of six tons per twenty-four hours and was revolved at a speed of one revolution per minute. The time of treatment was about one hour. Under these conditions the degree of exposure of the heated charge to the furnace gases was sufficient to remove the volatilized metals in the time allowed.

The gaseous product of the furnace was cooled and filtered through woolen and cotton bags and the fume thus collected. The nature of this product was such that it was non-corrosive to these bags.

The products resulting from the above treatment assayed as follows:

Fume; gold, 0.31 oz. per ton; silver, 131.0 oz. per ton; lead, 37.3 per cent; silica ($SiO_2$), 25.0 per cent; iron, 3.7 per cent; sulfur, 3.2 per cent; lime (CaO), 4.5 per cent.

Calcine; gold, 0.01 oz. per ton; silver, 0.5 oz. per ton; lead, 0.1 per cent; silica ($SiO_2$), 89.2 per cent; iron, 5.0 per cent; sulfur, 0.1 per cent; lime (CaO), 1.4 per cent.

This complete operation represented a recovery of 98.9 per cent of the lead, 98.3 per cent of the silver, 88.5 per cent of the gold.

The drawings show a flow sheet which illustrates a practical operation of the process.

It is to be understood that a number of variations may be made in the procedure without affecting the principle of the method. For example, there may not be enough coarse valuable mineral in an ore to warrant the use of gravity concentration; or the ore may not require treatment by flotation, if it is sufficiently free from floatable minerals. An oxidizing roast may precede the volatilizing treatment and may be the only preliminary treatment required. In some cases no preliminary treatment may be necessary, if the ores are properly selected or mixed. In other cases the desired composition of the furnace charge may be attained by the addition of certain relatively infusible substances, such, for instance, as lime or silica, to the ore. The feed may be added either dry or wet to the volatilization furnace. Other types of volatilization furnaces and other fume-collecting devices may be used.

The removal of sulfids effected by concentration or otherwise in the regulation of the furnace charge, as specified, eliminates from the furnace gases, substances such as sulfuric acid and sulfur oxides that are corrosive and destructive to bags through which the furnace gases containing them are filtered.

In the chlorid-volatilization process the gaseous product of the furnace is almost necessarily of an acid character and will corrode and destroy cotton and woolen bags used in its filtration. The collected chlorid fume requires an intermediate treatment to change its chemical composition and make it suitable for smelting. In our process, by reason of the fact that we add no chlorids, the gaseous product of the furnace is not rendered corrosive and destructive by reason of substances added to the charge, and the substantial absence of chlorin in the collected fume renders this fume amenable to smelting without intermediate chemical treatment.

What we claim is:

1. The process of extracting metals from their ores by subjecting the ore to the action of heat, which consists in so regulating the composition of the material to be treated that no considerable part of its non-volatilizable constituents shall become fused or liquefied at the temperature at which the metals are substantially completely volatilized, and collecting the volatilized metals.

2. The process of extracting from ores, metals occurring entirely or partially in a state in which they are not recoverable in substantial proportion by standard gravity or flotation concentration processes, or which occur in ores of such character that the non-volatilizable constituents undergo substantial fusion or liquefaction at the temperature of volatilization of the metals, which process consists in so regulating the composition of the material to be treated that no considerable part of its non-volatilizable constituents shall become fused or liquefied at the temperature at which the metals are substantially completely volatilized, charging such material into a furnace, heating the same to a temperature above that at which the metals will volatilize and not above the temperature at which the non-volatilizable constituents will exist in a state of incipient fusion, and collecting the volatilized metals.

3. The process of extracting metals from their ores by subjecting the ore to the action of heat, which consists in so correlating the composition of the material to be treated, the temperature, the time of treatment, and the exposure of the material under treatment to furnace gases, that the metals shall be substantially completely volatilized below the temperature at which liquefaction of any considerable part of the non-volatilizable constituents takes place, and collecting the volatilized metals.

4. The process of extracting metals from their ores by subjecting the ore to the action of heat, which consists in so correlating the composition of the material to be treated, the temperature, the time of treatment, and the exposure of the material under treatment to furnace gases, that the metals shall be substantially completely volatilized at a temperature not exceeding that at which the non-volatilizable constituents will exist in a state of incipient fusion, and collecting the volatilized metals.

5. The process of extracting metals from their ores by subjecting the ore to the action of heat, which consists in so correlating the composition of the material to be treated, the temperatures, the time of treatment, and the exposure of the material under treatment to furnace gases, that the metals shall be substantially completely volatilized at a temperature below that at which liquefaction of any considerable part of these non-volatilizable constituents takes place, and that incipient fusion of a substantial part of the non-volatilizable constituents will occur at a temperature below that necessary for substantially complete volatilization, and collecting the volatilized metals.

6. The process of extracting metals from oxidized ores by subjecting the ore to the action of heat, which consists in so correlating the composition of the material to be treated, the temperature, the time of treatment, and the exposure of the material under treatment to furnace gases, that the metals shall be substantially completely volatilized below the temperature at which liquefaction of any considerable part of the non-volatilizable constituents takes place, and collecting the volatilized metals.

7. The process of extracting metals from ores containing one or more of the metals, lead silver and gold, by subjecting the ore to the action of heat, which consists in so correlating the composition of the material to be treated, the temperature, the time of treatment, and the exposure of the material under treatment to furnace gases, that the metals shall be substantially completely volatilized below the temperature at which liquefaction of any considerable part of the non-volatilizable constituents takes place, and collecting the volatilized metals.

8. The process of extracting metals from oxidized ores containing one or more of the metals, lead, silver and gold, by subjecting the ore to the action of heat, which consists in so correlating the composition of the material to be treated, the temperature, the time of treatment, and the exposure of the material under treatment to furnace gases, that the metals shall be substantially completely volatilized below the temperature at which liquefaction of any considerable part of the non-volatilizable constituents takes place, and collecting the volatilized metals.

9. The process of extracting metals from partially oxidized ores containing one or more of the metals, lead, silver and gold, by subjecting the ore to the action of heat, which consists in so correlating the composition of the material to be treated, the temperature, the time of treatment, and the exposure of the material under treatment to furnace gases, that the metals shall be substantially completely volatilized below the temperature at which liquefaction of any considerable part of the non-volatilizable constitutents takes place, and collecting the volatilized metals.

10. The process of extracting metals from their ores by subjecting the ore to the action of heat, which consists in so correlating the composition of the material to be treated, the temperature, the time of treatment and the exposure of the material under treatment to furnace gases, that the furnace gases shall be non-corrosive and the metals shall be substantially completely volatilized below the temperature at which liquefaction of any considerable part of the non-volatilizable constitutents takes place, and collecting the volatilized metals.

11. The process of extracting metals from their ores by subjecting the ore to the action of heat, which consists in so correlating, the composition of the material to be treated, the temperature, the time of treatment, and the exposure of the material under treatment of furnace gases, that the metals shall be substantially completely volatilized below the temperature at which liquefaction of any considerable part of the non-volatilizable constituents takes place, and collecting the volatilized metals in the form of a fume of substantially non-chlorid character.

12. The process of extracting metals from partially oxidized ores containing one or more of the metals, lead, silver and gold, by subjecting the ore to the action of heat, which consists in so correlating the composition of the material to be treated, the temperature, the time of treatment, and the exposure of the material under treatment to furnace gases, that the furnace gases shall be non-corrosive and the metals shall be substantially completely volatilized below the temperature at which liquefaction of any considerable part of the non-volatilizablee constituents takes place, and collecting the volatilized metals in the form of a fume of substantially non-chlorid character.

13. The process of extracting metals from their ores by subjecting the ore to the action of heat, which consists in regulating the composition of the furnace charge by removing from the ore a substance or substances that liquify or bring about liquefaction of any considerable portion of the non-volatilizable constituents at a temperature below that at which substantially complete volatilization of the metals will take place, substantially as described.

GEORGE H. WIGTON.
SAMUEL M. SEDDON.